(12) United States Patent
Becker et al.

(10) Patent No.: US 8,677,830 B2
(45) Date of Patent: Mar. 25, 2014

(54) APPARATUS AND METHOD FOR ACQUIRING MECHANICAL LOADS ON THRUST ELEMENTS

(71) Applicant: Airbus Operations GmbH, Hamburg (DE)

(72) Inventors: Thomas Becker, Osterholz-Scharmbeck (DE); Martin Kluge, Koenigsbrunn (DE); Michael Schneider, St. Wendel (DE); Ulrich Schmid, Vienna (AT); Achim Bittner, Burgkunstadt (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/721,697

(22) Filed: Dec. 20, 2012

(65) Prior Publication Data
US 2013/0152704 A1 Jun. 20, 2013

Related U.S. Application Data

(63) Continuation of application No. PCT/EP2011/060252, filed on Jun. 20, 2011.

(60) Provisional application No. 61/357,805, filed on Jun. 23, 2010.

(30) Foreign Application Priority Data

Jun. 23, 2010 (DE) .......................... 10 2010 024 711

(51) Int. Cl.
 *G01B 5/00* (2006.01)
(52) U.S. Cl.
 USPC .............................................. 73/778; 73/802

(58) Field of Classification Search
USPC ............. 73/777–778, 802, 862.624–862.627, 73/862.53
See application file for complete search history.

(56) References Cited

U.S. PATENT DOCUMENTS

| | | | |
|---|---|---|---|
| 4,901,586 A | | 2/1990 | Blake et al. |
| 5,952,819 A | * | 9/1999 | Berkcan et al. ........... 324/117 R |
| 6,487,505 B1 | | 11/2002 | Mock et al. |

(Continued)

FOREIGN PATENT DOCUMENTS

| | | |
|---|---|---|
| DE | 10063535 A1 | 7/2002 |
| DE | 102005043038 A1 | 12/2006 |

OTHER PUBLICATIONS

Schneider, Michael et al, Ultra-precise strain measurement applying a resonating microstructure, Jan. 2010, pp. 1-5.

(Continued)

*Primary Examiner* — Max Noori
(74) *Attorney, Agent, or Firm* — Ingrassia Fisher & Lorenz P.C.

(57) ABSTRACT

A device for acquiring mechanical loads on mechanically loaded bodies is provided. The device exhibits a resonance-capable micro-bridge structure, an alternating voltage source with a variable frequency, an impedance measuring device for acquiring the impedance of the micro-bridge structure and an electronic unit for receiving determined impedance values and changing the frequency of the alternating voltage source. By exciting the micro-bridge structure and measuring its impedance, a conclusion can be drawn as to the expansion-dependent resonance frequency, which in return makes it possible to determine the expansion, and hence the mechanical load. Such a device is sufficiently accurate, and largely independent of outside influences.

18 Claims, 5 Drawing Sheets

(56) References Cited

U.S. PATENT DOCUMENTS

| | | | |
|---|---|---|---|
| 6,587,188 B2 | 7/2003 | Gleine et al. | |
| 6,650,204 B2* | 11/2003 | Ma et al. | 333/188 |
| 6,954,020 B2 | 10/2005 | Ma et al. | |
| 7,051,975 B2 | 5/2006 | Pohl et al. | |
| 7,146,866 B2* | 12/2006 | Morelli et al. | 73/862.69 |
| 2007/0033990 A1* | 2/2007 | Grey et al. | 73/53.01 |
| 2007/0164417 A1* | 7/2007 | Todd et al. | 257/685 |
| 2011/0315981 A1* | 12/2011 | Xu et al. | 257/43 |

OTHER PUBLICATIONS

International Searching Authority, International Search Report for PCT/EP2011060252, dated Sep. 16, 2011.

German Patent Office, German Office Action for German Patent Application No. 10 2010 024 711.1, dated Aug. 31, 2011.

* cited by examiner

APPARATUS AND METHOD FOR ACQUIRING MECHANICAL LOADS ON THRUST ELEMENTS

CROSS-REFERENCE TO RELATED APPLICATIONS

This is a continuation of International Application No. PCT/EP2011/060252, filed Jun. 20, 2011, which application claims priority to German Patent Application No. 10 2010 024 711.1, filed Jun. 23, 2010 and to U.S. Provisional Patent Application No. 61/357,805, filed Jun. 23, 2010, which are hereby incorporated by reference in their entirety.

TECHNICAL FIELD

The technical field relates to an apparatus for acquiring mechanical loads on thrust elements, a method for acquiring mechanical loads on thrust elements, and an aircraft having a flap adjustment system with thrust elements, the mechanical loads of which are acquired with an apparatus according to the present disclosure.

BACKGROUND

Various apparatuses and procedures exist in prior art for acquiring mechanical loads on assemblies. One especially widespread method involves acquiring the expansion of a respective assembly, which can be used for calculating the arising forces, given knowledge of the mechanical properties, such as the modulus of elasticity of the used material.

The expansion is acquired using so-called expansion-measuring strip ("DMS"), which consist of a meandering measuring grid in a thin carrier film, on which the respective assembly is adhesively bonded and then subjected to an electrical resistance measurement. The electrical resistance of the expansion-measuring strip depends on its expansion, i.e., the resistance increases during an expansion, and the resistance decreases during a compression. There is more or less of a dependence on temperature, depending on the design of the expansion-measuring strip. Given a static load on an expansion-measuring strip, a slow change in resistance over time can be noticed, despite a constant assembly expansion. This can be explained by the fact that the expanded measuring grid acts similarly to a loaded spring, which allows shear stresses to come about between the measuring grid and carrier film. These stresses lead to a relaxation of the plastic in the expansion-measuring strip and the adhesive, which preferably arises at the reversal points of the measuring grid. In addition, a certain transverse sensitivity must be observed given a non-linear load, and both the expansion-measuring strip and used adhesive are sensitive to moisture, so that no constant precision can be achieved during measurement, especially when expansion-measuring strips are used in highly variable environmental conditions.

Mechanical loads are usually not measured in the flap adjustment kinematics of conventional commercial aircraft, in particular in high-lift systems with thrust elements. At the present time, use is made predominantly of overload switches, which protect an actuator that moves the flap adjusting kinematics against overload.

DE 10326799 B3 discloses that mechanical errors in prior art can lead to overloads or undesired behavior on the part of a flap adjustment apparatus, for example an asymmetrical activation of flap elements. For this reason, the entire apparatus may be basically shut down when such errors are detected, and may be locked in their current position by means of braking devices. The disadvantage to this procedure may be the complete loss of functionality associated with the landing flap system in the event of an error.

DE 10004384 C2 shows an arrangement and a method for using an optical sensor to acquire expansions and temperatures as well as changes therein for a cover layer applied to a carrier made in particular of metal, plastic or ceramic. The prior art specified there mentions that expansion is currently determined primarily by means of expansion-measuring strips ("DMS"). In addition, other objects, desirable features and characteristics will become apparent from the subsequent summary and detailed description, and the appended claims, taken in conjunction with the accompanying drawings and this background.

SUMMARY

In order to determine mechanical loads acting on bodies, for example on thrust elements within the adjustment kinematics of flaps on an aircraft, it would be advantageous to determine the expansion of the body in-situ. However, since its thrust elements are subjected to very dynamically varying environmental conditions, including variable environmental pressure, variable temperature, variable atmospheric humidity and the like, for example, in the example involving the adjustment kinematics, the use of expansion-measuring strips would not permit an especially high level of precision. Further, measurements with DMS-based sensors require a high electrical current typically lying in the mA range, thereby necessitating a high expenditure of energy.

Therefore, according to various aspects of the present disclosure provided is an apparatus that enables an in-situ measurement of body expansion with a very high level of precision, so that precise mechanical loads on bodies can be determined.

According to additional aspects, provided is an apparatus having as low an energy consumption as possible.

The expression of mechanically loaded bodies must here be understood to mean that any type of mechanically loaded parts can basically be subjected to an expansion measurement with the apparatus according to the present disclosure, so that the geometric configuration of the body is unimportant. A body to be examined could here be subjected to an axial force, a transverse force or a combination of these forces. The apparatus according to the present disclosure can be used on any body that experiences an expansion under a mechanical load.

In one of various aspects of the present disclosure, the apparatus exhibits a resonance-capable micro-bridge structure, an alternating voltage source with a variable frequency, an impedance measuring device for acquiring an impedance of the micro-bridge structure, and an electronic device for receiving determined impedance values of the impedance-measuring device and for varying the frequency of the alternating voltage source. The alternating voltage source is connected with the micro-bridge structure to generate an oscillation of the micro-bridge structure. The micro-bridge structure is used so as to be applied to the body to be observed and aligned with an expected direction of force in terms of the force acting on the body, in order to permit an expansion measurement in this direction of force. To determine mechanical loads for several directions, a plurality of micro-bridge structures can be used, which are able to perform an expansion measurement in the respective direction of force.

A micro-bridge structure is to be regarded as a two-sided, clamped beam structure, which comprises a carrier layer and at least one active layer. For example, the carrier layer can be made out of silicon nitride, while the active layer could comprise a piezoelectric material, in one example, aluminum nitride (AlN), e.g., yielding an Al—AlN—Al arrangement.

The active layer could be realized in the form of a thin film. Because of the piezoelectric properties, the micro-bridge structure generates charges or an electrical voltage when moved, or performs a movement when an electrical voltage is applied. When the micro-bridge structure is excited with a resonance frequency predetermined by the geometric properties of the micro-bridge structure and the mechanical properties of the involved materials, the micro-bridge structure begins to execute a characteristic resonance oscillation.

The basic precondition of the apparatus according to the present disclosure is that the resonance frequency of an oscillating beam structure increases as the beam expands, comparable to the change in pitch of a guitar string that is accompanied by an expansion of the string. This shift in resonance frequency is linear with the expansion of the beam for small deflections, and hence serves as a measure for expansion $\in$. The sensitivity of the change in resonance frequency can itself be easily adjusted by the geometry of the beam.

The piezoelectric oscillator embodying the described beam structure comprises a measurable, frequency-dependent impedance, which rises with greater approximation to a resonance frequency, and peaks at the resonance frequency. The micro-bridge structure is connected with the alternating voltage source in order to excite oscillation by the micro-bridge structure. If the frequency of the excited electrical voltage corresponds to the resonance frequency of the micro-bridge structure, the micro-bridge structure performs a resonance oscillation. According to the present disclosure, the impedance of the micro-bridge structure is determined given an excited oscillation, and serves as a suitable measured variable for the shift in resonance. The impedance is greatest once the resonance frequency has been reached, while the impedance drops given a deviation of the excited voltage frequency from the resonance frequency, as well as at levels both under and over the resonance frequency.

The goal is to determine the resonance frequency dependent on the expansion of the micro-bridge structure via the impedance measurement, or to determine a deviation from the resonance frequency, so as in return to be able to determine the expansion of the micro-bridge structure from the resonance frequency or deviation from the resonance frequency, making it possible to draw conclusions about the arising longitudinal forces of a part on which the micro-bridge structure is arranged.

The precision of such an apparatus is very high when compared with expansion-measuring strips, with no hysteresis effects in particular being encountered.

In one exemplary embodiment of the present disclosure, the electronic unit is capable of continuously running through the variable frequency of the exciting alternating voltage in a predetermined range around a resonance frequency in an unloaded reference state that would arise given an unloaded assembly. At the same time, the electronic unit is capable of acquiring and comparing a series of impedance values while running through the frequency over this range. The resonance frequency of the micro-bridge structure associated with the current expansion must be allocated to the frequency of the voltage at which the highest impedance value was determined.

Since a neutral resonance frequency in a reference state can be ascertained or calculated accurately enough, the sufficiently large selected frequency range can be run through to determine the currently present resonance frequency of the micro-bridge structure. Given a sufficiently fine division of the traversed frequencies or an iterative approximation, for example in a Newtonian iteration process, the current resonance frequency, i.e., the maximal impedance frequency, can be determined as precisely as desired, which is permitted in return for as accurate a measurement of the current expansion, and hence the current load on the body carrying the micro-bridge structure.

One conceivable alternative would be a measured value acquisition in which the impedance is determined at a given frequency, ideally within the range of the rising or falling flank around the resonance frequency, and the change in impedance relative to a previously determined value is ascertained when a mechanical load arises. The frequency for the exciting electrical voltage could then be adjusted in such a way that an ascertained impedance difference disappears, as a result of which the originally determined impedance value is reached again.

In one exemplary embodiment, the apparatus additionally comprises a second micro-bridge structure, which is arranged at about a 90° angle relative to the first micro-bridge structure. The second micro-bridge structure is also connected with an alternating voltage source having a variable frequency, and with an electronic unit for receiving determined impedance values and changing the frequency of the alternating voltage source. Assuming a highly directed mechanical load on the body, for example by a pure axial force, the second micro-bridge structure is independent of the mechanical load on the examined body due to the arrangement of the two micro-bridge structures at about a 90° angle relative to each other, but does exhibit a temperature-dependent expansion. Since both the first micro-bridge structure and the second micro-bridge structure are exposed to the same temperature-dependent expansion, the determined temperature-dependent expansion of the second micro-bridge structure can be used to computationally offset the temperature-dependent expansion of the first micro-bridge structure. This makes it possible to determine body expansion even more precisely.

In another exemplary embodiment of the present disclosure, the electronic unit could store a look-up table containing the correlation between the frequency of the exciting alternating voltage, the measured impedance and the accompanying expansion in the electronic unit. Therefore, given knowledge of the frequency of the exciting voltage, the impedance of the micro-bridge structure, as well as environmental parameters that influence the measurement, such as temperature, the electronic unit is able to read out or interpolate the accompanying expansion from this look-up table. In this way, the expansion of the body becomes especially easy to ascertain, without having to determine the resonance frequency. The accompanying look-up table can be compiled through experimental studies.

Of course, several micro-bridge structures can also be connected with just a single electronic unit. The electronic unit could subject all micro-bridge structures to an impedance measurement separately or sequentially, wherein a simultaneous measurement should allow the electronic unit to supply a plurality of alternating voltages, or allow the electronic unit to actuate a plurality of alternating voltage sources, linked with parallel impedance measurements.

The present disclosure can also provide a method for acquiring mechanical loads on mechanically loaded bodies. In one example, the method can include exciting a resonance-capable micro-bridge structure arranged on the body with an alternating voltage at a predetermined frequency, measuring the impedance of the micro-bridge structure, and ascertaining the expansion as a function of the measured impedance and the frequency of the exciting alternating voltage. If the material properties of the body are known, the ascertained expansion can be used to determine the mechanical load on the body.

As already described above, another exemplary embodiment of a method according to the present disclosure can involve running through a predetermined frequency range around a resonance frequency with the micro-bridge structure in a reference state and continuously determining impedance values. The frequency at which the impedance is highest can be regarded as the resonance, so that the frequency of the exciting voltage associated with the peak impedance is to be interpreted as the resonance frequency. If this resonance frequency is known, the expansion of the micro-bridge structure can be determined, which finally makes it possible to calculate the mechanical loads on the body.

In like manner, the method according to the present disclosure can include reading the expansion from a look-up table as described in detail above.

In one exemplary embodiment, the temperature influences are balanced out by determining the temperature-induced expansion of a second micro-bridge structure in about a 90° arrangement and then subtracting the determined expansion of the micro-bridge structure monitoring the thrust element.

In both the apparatus according to the present disclosure and the method according to the present disclosure, it could be advantageous for ascertaining the expansion to correct the frequency of the exciting alternating voltage given a changing load in such a way that the impedance remains constant. The frequency change necessary for this purpose can be used to determine the change in expansion based on the methods mentioned above.

Finally, the various teachings of the present disclosure also provides an aircraft having flap adjustment kinematics, which exhibits at least a predominantly axially loaded thrust element with a micro-bridge structure arranged thereupon. The apparatus according to the present disclosure is especially suitable for monitoring such mechanical elements, since the micro-bridge structure is largely independent of environmental influences, and exhibits no hysteresis effects. Temperature-dependent fluctuations in the determined expansion can be determined and computationally offset by arranging a second micro-bridge structure at about a 90° angle relative to the micro-bridge structure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
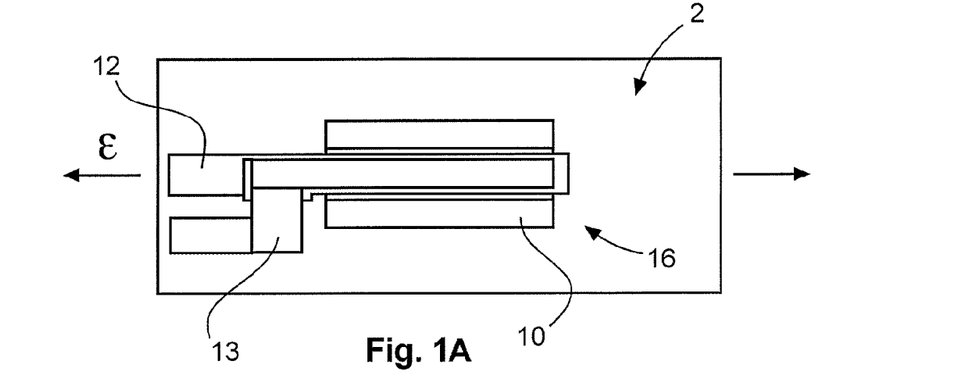
FIG. 1A and FIG. 1B show a micro-bridge structure, top view and side view.
Figure 1B:
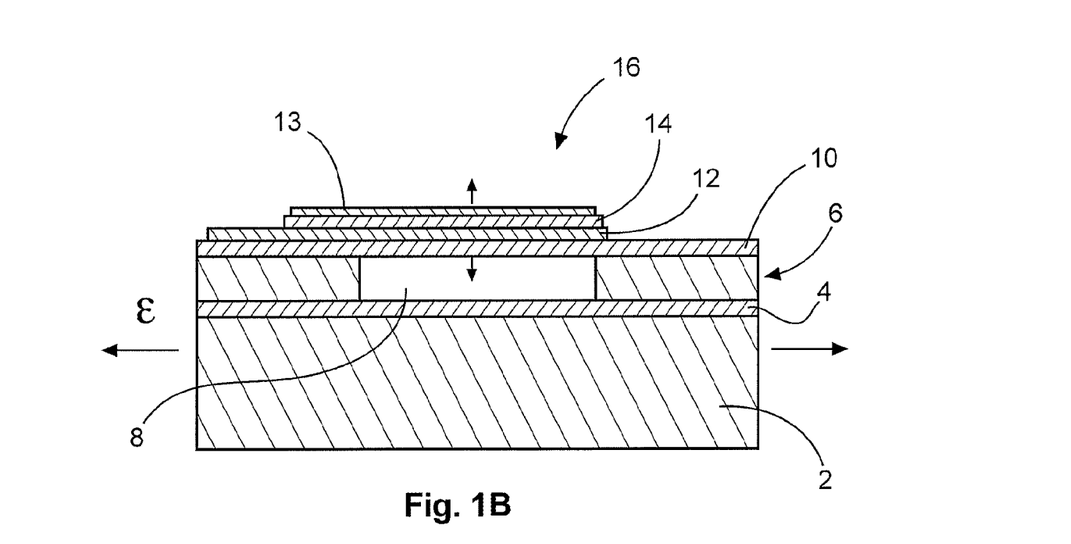

FIGS. 1A and 1B show a part or a body 2 to be examined, onto which a dielectric 4 with a fixed layer 6 is arranged, wherein the fixed layer 6 can be equipped with a recessed structure 8, for example a channel. This recessed structure could be fabricated using a conventional dry or wet chemical etching technique, for example, which enables especially precise processing. The fixed layer 6 could be made out of silicon, for example. The fixed layer 6 bears a carrier layer 10, situated on which is a first electrode 12, a second electrode 13 and an active layer 14 arranged between the first electrode 12 and second electrode 13. The active layer 14 is made out of a piezoelectric material, in one example, aluminum nitride (AlN).

When excited via the first electrode 12 and second electrode 13, this micro-bridge structure 16 is able to perform an oscillation via an alternating voltage source. If the frequency of the alternating voltage source corresponds to a resonance frequency of the micro-bridge structure 16 determined by the geometric dimensions subjected to expansion, the latter performs a resonance oscillation. The active layer 14 shown in cross section on FIG. 1B, which in the form shown could also be referred to as a beam element, can oscillate toward the recessed structure 8 or away from the recessed structure 8. The resonance frequency here depends on the current expansion of the micro-bridge structure 16, as can be analytically determined by the following equation assuming a rectangular cross section of the beam structure:

$$v_n(\varepsilon) = v_n(0) \cdot \sqrt{1 + \gamma \varepsilon \frac{l^2}{h^2}} \qquad (1)$$

In an unloaded case, the resonance frequency is calculated as:

$$v_1(0) = \frac{4,73^2}{2\pi} \cdot \sqrt{\frac{E(1-v^2)bh^3}{12\rho A l^4}} \qquad (2)$$

The term $bh^3/12$ here corresponds to the geometrical moment of inertia of a beam structure having a rectangular cross sectional area A, a width b, a height h and a length l. E stands for the modulus of elasticity, v for the transverse contraction number or Poisson number, and $\rho$ for the density of the beam structure.

For very low voltage values $\varepsilon \ll 1$, the shift in resonance frequency can be determined as follows:

$$v_n(\varepsilon) = v_n(0) + \frac{1}{2}\gamma_n v_n(0)\frac{l^2}{h^2} \cdot \varepsilon + \ldots \qquad (3)$$

The term $\gamma_n$ denotes a geometry-independent prefactor. As a consequence, the largest shift in resonance frequency can be achieved using the first resonance mode, since the value $\gamma_n$ is at its maximum for mode n=1.

The following Table 1 lists all coefficients required for calculating $v_n$ (∈) for resonance modes of a higher order.

TABLE 1

| n | $k_n$ | $v_n/v_0$ | $\gamma_n$ |
|---|---|---|---|
| 1 | 4.73 | 1 | 0.2949 |
| 2 | 7.8532 | 2.7566 | 0.1453 |
| ≥3 | $(n + \frac{1}{2})\pi$ | $(k_n/4.73)^2$ | $\dfrac{12(k_n - 2)}{k_n^3}$ |

The following Table 2 introduces parameters that were used in an exemplary model for verifying the function of the device according to the present disclosure.

TABLE 2

| Parameter | Value |
|---|---|
| l | 200 μm |
| b | 10 μm |
| h | 1 μm |
| E | $3.78 \cdot 10^{11}$ Pa |
| ν | 0.22 |
| ρ | 3300 kg/m³ |

In order to verify the theoretical correlations described above, the following Table 3 compares the analytical results with a FEM calculation of the model described by the parameters from Table 2. As evident from the comparison, the analytical model and numerical results are in very good agreement.

TABLE 3

| n | $v_{n, analytical}$ (0) in MHz | $v_{n, FEM}$ (0) in MHz |
|---|---|---|
| 1 | 0.268 | 0.268 |
| 2 | 0.740 | 0.739 |
| 3 | 1.450 | 1.450 |
| 4 | 2.397 | 2.398 |
| 5 | 3.580 | 3.586 |
| 6 | 5.001 | 5.014 |
| 7 | 6.658 | 6.683 |
| 8 | 8.551 | 8.595 |

Figure 2:
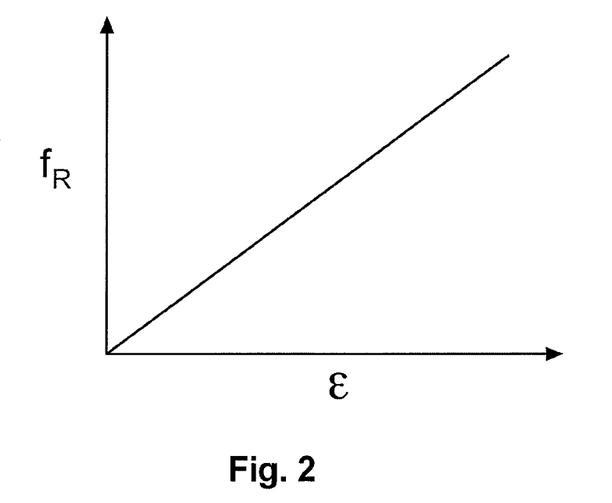
FIG. 2 shows the dependence between expansion and resonance frequency.

FIG. 2 shows the resonance frequency as a function of expansion ∈ in a chart. In the range of small expansions, there is a linear dependence between the shift in resonance frequency and expansion.

Figure 3:
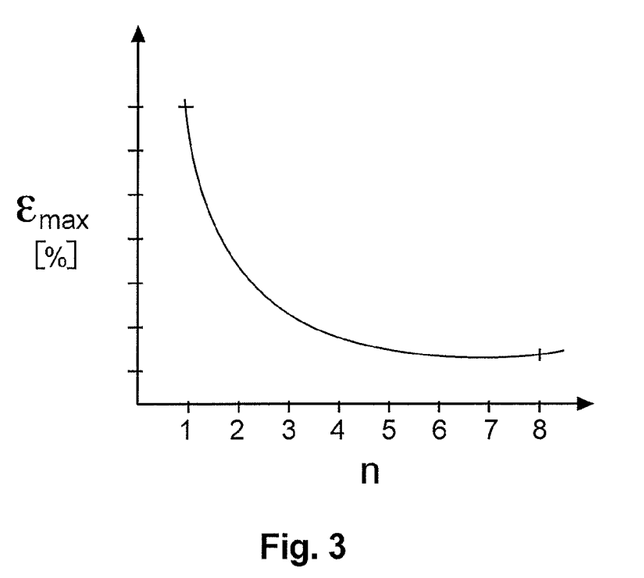
FIG. 3 qualitatively illustrates a conceivable peak expansion as a function of the oscillation mode sequence.

As further evident from FIG. 3, a maximum shift in resonance frequency is present at a maximum expansion $\epsilon_{max}$ in oscillation mode n=1. For example, an especially readily measurable shift in resonance frequency could be achieved in about the 10% range. This value can be adjusted with the ratio between the length and height of the micro-bridge structure 16 (l/h). Since the value for $\lambda_n$ drops as mode order n rises, the influence of expansion on the shift in higher order resonance frequencies becomes increasingly negligible.

The calculations presented above were performed on the assumption of a complete aluminum nitride film having a thickness of about 1 μm. A somewhat more realistic approach could involve a micro-bridge structure with a layered structure, for example comprising $Si_3N_4$/Al/AlN/Al with thicknesses of about 1000/150/700/150 nm (totaling about 2 μm). The analytical calculations coincide very well with the FEM simulation when weighted averages are assumed for the relevant material properties E, ν and ρ of the different material layers. These examples should not be viewed as a limitation. The description of features essential to the present disclosure opens up a wide range of usable materials to the expert.

For example, aluminum nitride could be replaced by any other type of piezoelectric material in the form of a thin film.

Table 4 shows parameters of a micro-bridge structure for a second comparison between analytical results and an FEM calculation, wherein substantially the mentioned geometric parameters of the more realistic approach were used. In comparison to Table 2, the thickness of the micro-bridge structure has doubled, and the modulus of elasticity E has diminished somewhat. As a result, the shift $v_n$ in resonance frequency is less distinctly obvious, enabling a more precise measurement.

TABLE 4

| Parameter | Value |
|---|---|
| l | 200 μm |
| b | 10 μm |
| h | 2 μm |
| E | $2.68 \cdot 10^{11}$ Pa |
| ν | 0.245 |
| ρ | 3110 kg/m³ |

Finally, Table 5 shows the analytical results as contrasted with the FEM results on the basis of Table 4. While the shift in resonance frequency drops by about 3% at $\epsilon_{max}$ with this more realistic calculation, this is still very easily measurable.

TABLE 5

| n | $v_{n, analytical}$ (0) in MHz | $v_{n, FEM}$ (0) in MHz |
|---|---|---|
| 1 | 0.463 | 0.465 |
| 2 | 1.28 | 1.28 |
| 3 | 2.50 | 2.51 |
| 4 | 4.13 | 4.14 |
| 5 | 6.17 | 6.17 |
| 6 | 8.62 | 8.59 |
| 7 | 11.5 | 11.4 |
| 8 | 14.7 | 14.6 |

Figure 4:
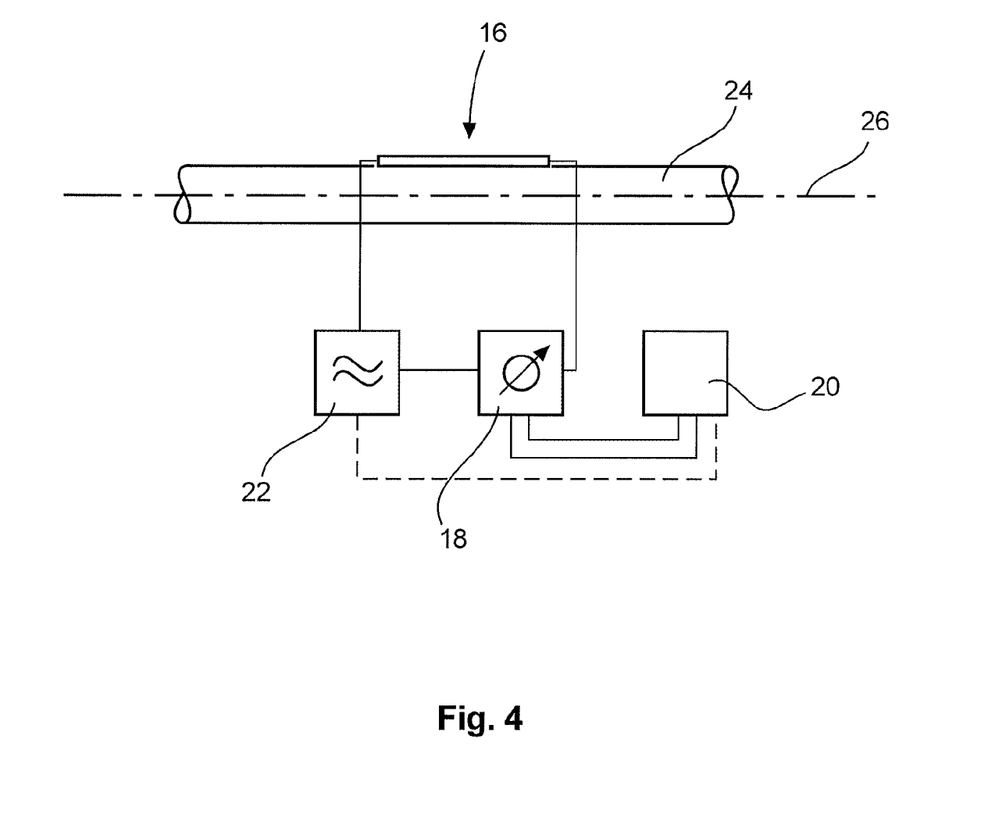
FIG. 4 shows a diagrammatic view of an apparatus according to the various teachings of the present disclosure.

In a kind of block diagram, FIG. 4 shows an apparatus according to the present disclosure that comprises a micro-bridge structure 16, which also comprises an impedance measuring device 18 and electronic unit 20 for receiving determined impedance values and changing a frequency of an alternating voltage supplied by an alternating voltage source 22. The alternating voltage source 22 is connected with the micro-bridge structure 16, and thereby set up to excite an oscillation of the micro-bridge structure 16. Changing a frequency of the supplied voltage alters the oscillation pattern of the micro-bridge structure 16. Since the alternating voltage source 22 and micro-bridge structure 16 yield a piezoelectric oscillator, measuring the impedance with the impedance measuring device 18 makes it possible to draw conclusions about a resonance frequency shift $v_n$, and hence an expansion of the micro-bridge structure. When running through a specific frequency range close to the resonance frequency of an unloaded micro-bridge structure 16, it is easily possible to run through the currently existing resonance frequency of the micro-bridge structure 16 at preset maximum values for expansion. In the conducted parallel impedance measurement, this made it possible to determine the frequency at which the highest impedance arises locally. This frequency is the resonance frequency of the micro-bridge structure 16, which permits a calculation of the expansion of the micro-bridge structure 16 that depends on the resonance frequency.

It is further conceivable to keep the impedance on a constant level through updating the frequency to acquire the expansion.

As an alternative, the electronic unit could store a readout table, which contrasts the frequencies of an exciting voltage, impedance values and expansions of the micro-bridge structure. At a known frequency for an exciting voltage and a measured impedance on the micro-bridge structure, the expansion that fits these parameters can be gleaned from the readout table, or interpolated from adjacent value ranges.

The micro-bridge structure 16 is placed on a thrust element 24, which is shown only by example and subjected to an axial force. In this example, the direction of force for this axial force runs parallel to a central axis 26 of the thrust element 24, toward which the main direction of extension of the micro-bridge structure 16 is also aligned.

Figure 5:
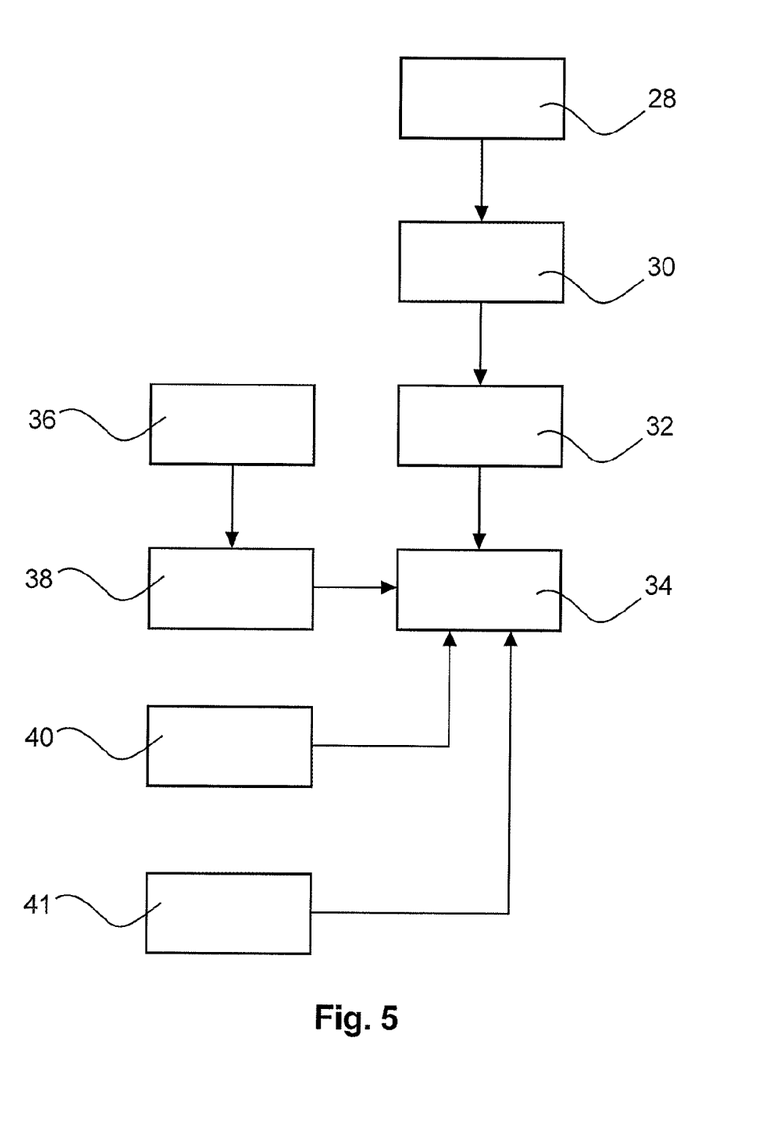
FIG. 5 shows a block-based illustration of a method according to the various teachings of the present disclosure.

FIG. 5 provides a block-based view of a method for acquiring mechanical loads on thrust elements. The method according to one exemplary embodiment of the present disclosure involves exciting 28 a resonance-capable micro-bridge 16 with a voltage having a predetermined frequency, measuring 30 the frequency-dependent impedance of the micro-bridge structure 16, and determining 32 the expansion as a function of the measured impedance and frequency of the exciting voltage. The determined expansion can be used for determining 34 the mechanical load on the thrust element given knowledge of the material properties of the thrust element.

In addition, a predetermined frequency range can be run through 36 around a resonance frequency with the micro-bridge structure in a reference state, so as to continuously ascertain impedance values. The frequency at an impedance peak can be regarded as the resonance frequency, from which the expansion can be determined 38. In like manner, the method according to the present disclosure can encompass reading an expansion from a look-up table 40, or correcting 41 the frequency to keep the impedance constant.

Figure 6:
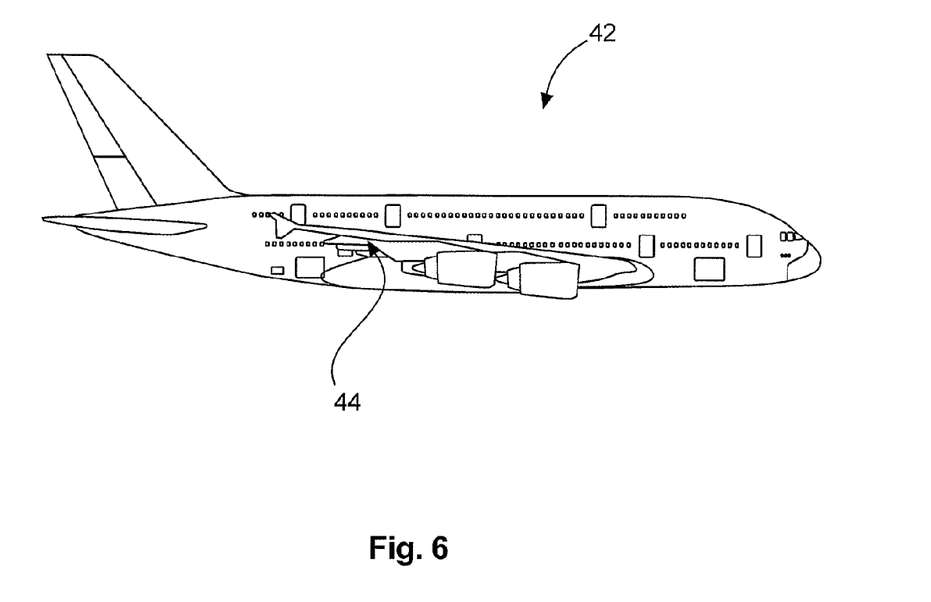
FIG. 6 shows an aircraft with flap adjustment kinematics having thrust elements, which are equipped with a device according to the various teachings of the present disclosure.

FIG. 6 shows an aircraft 42 with flap adjustment kinematics that has at least one thrust element with a micro-bridge structure arranged thereupon. The apparatus according to the present disclosure is suitable in one example for monitoring mechanical elements of the aircraft, since the micro-bridge structure is largely independent of environmental influences, and also exhibits no hysteresis effects. Arranging a second micro-bridge structure at about a 90° angle relative to the actually used micro-bridge structure offers a simple way of balancing out the temperature.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An apparatus for acquiring mechanical loads on a body, comprising:
    a resonance-capable micro-bridge structure;
    an alternating voltage source with a variable frequency;
    an impedance measuring device that determines the impedance of the micro-bridge structure; and
    an electronic unit the receives the determined impedance values and changes the frequency of the alternating voltage source,
    wherein the alternating voltage source is connected with the micro-bridge structure, so as to excite an oscillation of the micro-bridge structure, and the electronic unit is set up to determine the expansion of the micro-bridge structure from a measured impedance and an adjusted frequency of the alternating voltage source.

2. The apparatus of claim 1, wherein the micro-bridge structure is couplable to a body, and the electronic unit is set up to determine a force acting on the body from an acquired expansion and the known material properties of the body.

3. The apparatus of claim 1, wherein the electronic unit is set up to continuously run through the frequency of the alternating voltage source in a predetermined range around a resonance frequency in an unloaded reference state that would arise with the body unloaded, while at the same time continuously acquiring measured impedance values.

4. The apparatus of claim 1, wherein the electronic unit is set up to iteratively change the frequency of the alternating voltage source to a frequency at which a measured impedance reaches a peak.

5. The apparatus of claim 1, wherein the electronic unit is set up to acquire the impedance at a prescribed frequency that does not lie at the resonance-induced peak.

6. The device of claim 1, wherein the electronic unit is set up to correct the frequency of the alternating voltage for keeping an impedance constant, and determine the change in the load on the body from the frequency change.

7. The device of claim 1, further comprising a second micro-bridge structure, which is arranged on the body offset by about 90° relative to the micro-bridge structure.

8. The device of claim 7, wherein the electronic unit is set up to take into account a temperature drift in the micro-bridge structure from a temperature drift in the second micro-bridge structure.

9. The device of claim 1, wherein the expansion is obtained from a look-up table stored in the electronic unit, which contrasts the expansion, frequency of the alternating voltage source, and impedance.

10. A method for acquiring mechanical loads on a body, comprising:
    exciting a resonance-capable micro-bridge structure by means of an alternating voltage source having a variable frequency;
    determining an impedance spectrum around the resonance frequency with the micro-bridge structure in an unloaded state; and
    determining the expansion of the micro-bridge structure from a measured impedance and a set frequency of the alternating voltage source.

11. An aircraft, comprising:
    at least one adjustable control surface and adjustment kinematics with at least one thrust element;
    a resonance-capable micro-bridge structure arranged on the at least one thrust element,
    an alternating voltage source with a variable frequency,
    an impedance measuring device that acquires the impedance of the micro-bridge structure; and
    an electronic unit that receives the determined impedance values and changes the frequency of the alternating voltage source,
    wherein the alternating voltage source is connected with the micro-bridge structure to excite an oscillation of the micro-bridge structure, and the electronic unit is set up to determine the expansion of the micro-bridge structure and the at least one thrust element, from a measured impedance and an adjusted frequency of the alternating voltage source.

12. The aircraft of claim 11, wherein the electronic unit is set up to continuously run through the frequency of the alternating voltage source in a predetermined range around a resonance frequency in an unloaded reference state that would arise with the at least one thrust element unloaded, while at the same time continuously acquiring measured impedance values.

13. The aircraft of claim 11, wherein the electronic unit is set up to iteratively change the frequency of the alternating voltage source to a frequency at which a measured impedance reaches a peak.

14. The aircraft of claim 11, wherein the electronic unit is set up to acquire the impedance at a prescribed frequency that does not lie at the resonance-induced peak.

15. The aircraft of claim 11, wherein the electronic unit is set up to correct the frequency of the alternating voltage for keeping an impedance constant, and determine the change in the load on the at least one thrust element from the frequency change.

16. The aircraft of claim 11, further comprising a second micro-bridge structure, which is arranged on the at least one thrust element offset by about 90° relative to the micro-bridge structure.

17. The aircraft of claim 16, wherein the electronic unit is set up to take into account a temperature drift in the micro-bridge structure from a temperature drift in the second micro-bridge structure.

18. The aircraft of claim 11 wherein the expansion is obtained from a look-up table stored in the electronic unit, which contrasts the expansion, frequency of the alternating voltage source, and impedance.

* * * * *